UNITED STATES PATENT OFFICE.

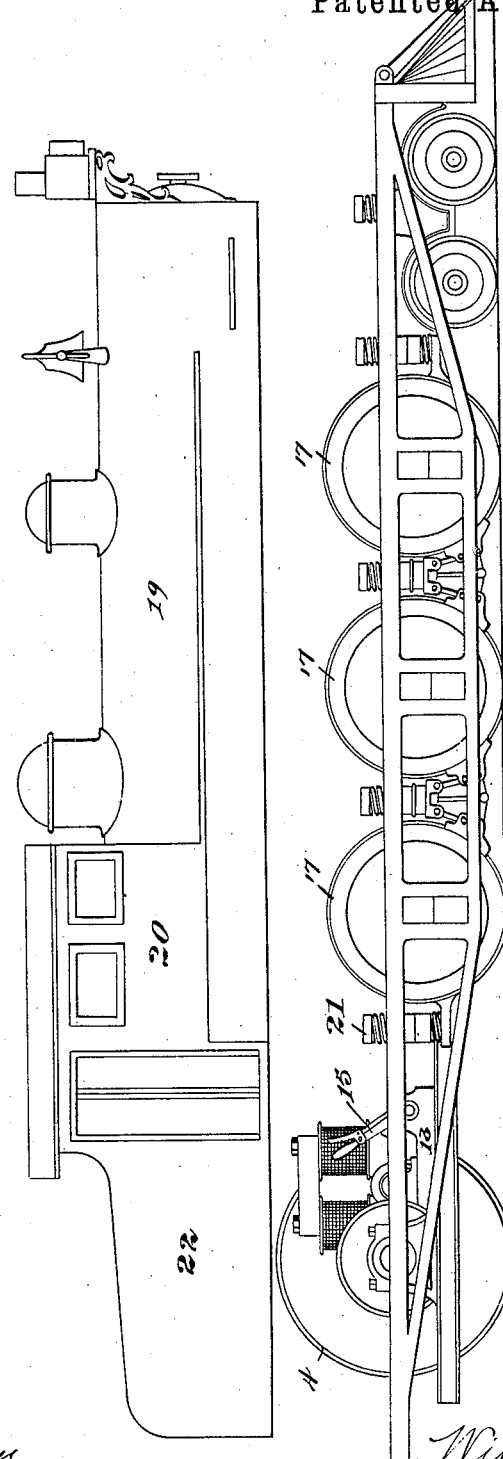

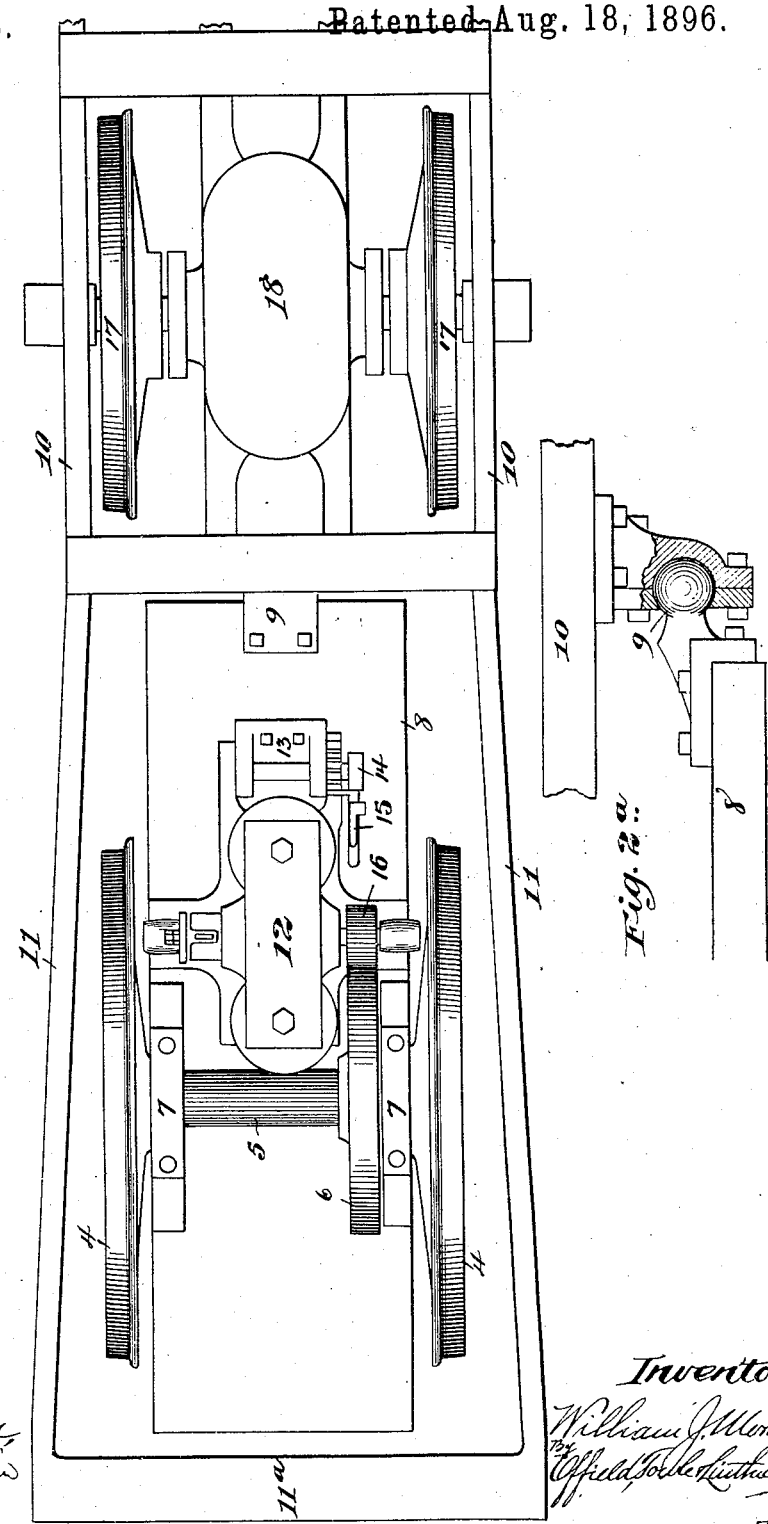

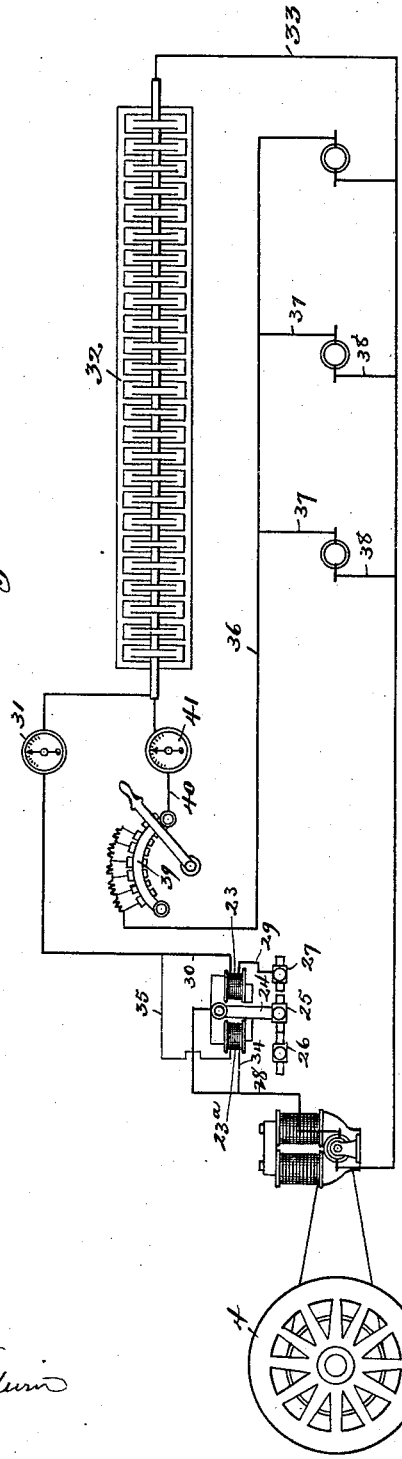

WILLIAM J. MORDEN, OF CHICAGO, ILLINOIS; LAURA H. MORDEN EXECUTRIX OF SAID WILLIAM J. MORDEN, DECEASED.

ELECTRIC CAR-LIGHTING.

SPECIFICATION forming part of Letters Patent No. 565,913, dated August 18, 1896.

Application filed October 22, 1895. Serial No. 566,450. (No model.)

*To all whom it may concern:*

Be it known that I, WILLIAM J. MORDEN, of Chicago, Illinois, have invented certain new and useful Improvements in Generating Electricity from Moving Trains, of which the following is a specification.

This invention has for its object to provide a practicable means for generating, storing, and utilizing electrical energy in connection with railway-trains; and the apparatus comprises a traction-motor pivotally connected to and trailing after the locomotive or one of the cars of a train, said traction-motor having a framework in which the traction-wheels are journaled, and said framework being adapted to support a dynamo; a dynamo mounted on said frame and having its shaft geared to the traction-wheels in such manner that the trailing of the wheels along the track-rails imparts rotary motion to the dynamo-shaft; a series of storage batteries mounted on some part of the train; suitable wiring and controlling devices whereby the electrical energy generated by the dynamo may be delivered to the storage batteries for charging the same, and motors and suitable wiring and controlling means whereby the current may be sent to the motors from the dynamo or from the storage batteries, so as to convert said energy again into motion.

In the accompanying drawings, Figure 1 is a side view in elevation, showing a suitable type of vehicle for the purposes of my invention in the form of a locomotive, but with the body thereof separated or raised above the truck and traction-motor so as to show the latter. Fig. 2 is an enlarged plan of a traction-motor and its frame and of the rear pair of carrying-trucks, showing a motor in relation thereto. Fig. 2ª is a sectional detail of a universal joint. Fig. 3 is a diagrammatic view showing the relative arrangement of the traction-motor wheels, the dynamo driven thereby, the storage batteries, and the motors for reconverting the energy and the electrical controlling apparatus.

In carrying out my invention I provide a traction-motor comprising a pair of large wheels 4, rigidly mounted upon an axle 5 and having a friction driving-wheel 6. This axle is journaled in suitable boxes, as 7, upon a frame 8, pivotally connected, and preferably by a universal joint, as at 9, to the truck-frame 10. This truck-frame is extended, as at 11, so as to embrace the motor. On the frame 8 I mount one or more dynamos 12, and preferably have the bed 13 of the dynamo capable of shifting along the frame, and for this purpose I may employ the eccentric shaft 14, having the operating-lever 15, with a suitable ratchet-and-pawl locking mechanism. On the dynamo-shaft is mounted a friction-pulley 16, adapted to be brought into driving contact with the large friction-wheel 6 on the axle of the traction-motor.

Obviously the traction-motor, its frame, and the dynamo mounted thereon may all rock around the axle 5 and may vibrate up and down or sway laterally independently of the movements of the truck-frame 10. In said truck-frame are journaled the axles of the truck-wheels 17, three pairs of the latter being shown. Upon the same frame also are mounted motors 18, one for each pair of truck-wheels and operatively connected to the axles thereof. Upon said truck-frame 10 and the extension 11 thereof may be mounted a body in the shape of a steam-boiler 19, having the cab 21, and the whole adapted to rest upon suitable carrying-springs 22, mounted upon said frames. Rearwardly of the cab is a hood or cap protecting the traction-motor and the dynamo mounted thereon.

Within the cab is arranged the current-regulating apparatus, comprising the manipulator or automatic switch having the solenoids 23 and 23ª and the pivoted magnet 24 and capable of movement between the rest 26 and the contact 27. The main electrical circuit is from the dynamo by way of the wire 28 to the pivot of the magnet 24; thence through the contact-block 27, wire 29, magnet 23, wire 30, through ammeter 31 to the storage batteries 32, the return being through the wire 33 to the dynamo. In order to protect the dynamo, a shunt-circuit is established by way of the wire 34, the magnet 23ª, and wire 35.

As shown in Fig. 3, the main circuit is open and the current generated by the dynamo passes over the shunt until the counter electromotive force is sufficient to move the magnet 25 into contact with the contact-piece 27, whereupon the current is over the main circuit above described. Now if the dynamo be stopped or the electromotive force of the batteries should be in excess of the electromotive force of the dynamo, then the current is reversed, the magnet 24 is repelled, and the main circuit is broken, the shunt-circuit still furnishing a path through which the battery-current passes in such feeble amount as not to deteriorate the battery, but sufficient to hold the magnet against the rest-block 26. The motors 18 are included in a branch circuit formed by the wire 36 and branches 37 38, the latter connecting with return 33 and the wire 36, having the movable switch, as at 39, regulating the power and speed and connected with the batteries by the wire 40, having the ammeter 41.

It will be understood that the electric apparatus above described does not of itself constitute a part of my invention, but is claimed herein as an element of a novel combination of apparatus for generating, storing, and reconverting electrical energy.

The power derived as above described may be used for any apparatus desired instead of or in addition to its use as a motive power for running the train. A practical use would be the supplying of a current for running electric fans and other accessories on or about the train and the lighting of a train.

In the practical operation of railway-trains the power of the locomotive is calculated for the maximum load which it is to draw, and usually the maximum capacity of the locomotive is not required except in a small percentage of its travel. It is also well known that in going downgrade or in making stops the energy of the locomotive, either directly or as represented by the compressed air of the brake system, is converted into heat by the friction of the brake-shoes upon the wheels to the detriment of the latter and is directly wasted. By my improvements the momentum of the train may be converted into electrical energy and stored without detriment to the perfect operation of the train and without appreciable loss of energy.

While the several forms of apparatus above described are well adapted to the purposes in view, changes may be made in the structural details within certain limits. I regard it as a novel and essential feature of my invention to mount the dynamo directly upon the frame of the traction-motor, because in that way only is it practicable to gear to the dynamo. If, for example, the dynamo were mounted upon the truck-frame or upon the body of a vehicle to which the trailing motor is attached, the oscillations of the vehicle-frame with reference to the motor-frame would be such as to disarrange the gearing. While I have shown friction-gearing for driving the dynamo, it is obvious that positive gearing might be substituted, either belt or spur gears. Of course the locomotive shown is only a conventional representation of a suitable apparatus for my invention. Storage batteries are intended to be inclosed within the shell or body 19, and the latter is provided with a sand-dome and with a second dome which may be used as a compressed-air reservoir for charging and operating the power-brake system, if one be employed.

I have shown a locomotive in order to illustrate how readily it may be adapted to the employment of my invention; but the trailing motor may be attached to a car the frame of which extends around the motor and is provided with suitable draft appliances, as 42, so that it may be coupled up in the train.

It will be seen that I employ in the complete apparatus the following instrumentalities: a traction-motor for driving the dynamo, a dynamo for generating an electrical current, storage batteries in which the electrical energy is stored, and electrical motors which are connected to the car-axle and adapted to utilize the electrical energy for driving the train.

It will further be noted that by the circuit-controlling mechanisms described the current generated by the dynamo may be sent either to the batteries or to the motors direct, or that it may be sent through the batteries to the motor, or that the dynamo may be cut out and the current sent from the batteries to the motor, so that the electrical energy applied by the motors may be used to propel the train and thereby run the dynamo.

I claim—

1. An apparatus for generating electricity from moving trains, comprising in combination a trailing traction-motor having a pair of wheels adapted to travel on the track-rails, a frame in which said wheels are journaled, said frame being pivotally connected to a vehicle and adapted to rock around the wheel-axle, a dynamo mounted on the frame and having a revolving armature parallel to the wheel-axle and driven from the motor-wheels, one member of the gearing being mounted on the axle and another member on the armature-shaft of the dynamo, and means for conveying away the electrical current from the dynamo, substantially as described.

2. An apparatus for generating electrical energy from moving trains, comprising in combination a vehicle, a trailing traction-motor inclosed within the main frame of the vehicle, said traction-motor having a pair of wheels traveling upon the track-rails, a frame in which said wheels are journaled and said frame being pivotally connected to the vehicle and adapted to rock around the wheel-axle, a dynamo mounted upon the frame and having a revolving armature parallel to the wheel-axle and gearing between the traction-wheels and the dynamo, one member of the gearing being mounted on the axle and another member on the armature-shaft of the dynamo, substantially as described.

3. An apparatus for generating electricity from moving trains, comprising in combination a vehicle, a trailing traction-motor pivotally connected thereto, a dynamo mounted on the frame of the traction-motor, and friction-gears mounted respectively upon the axle of the motor-wheels and the dynamo-shaft and means for shifting the gearing, substantially as described.

4. An apparatus for generating electrical power from moving trains, comprising in combination a trailing traction-motor having a pair of wheels adapted to travel on the track-rails, a frame pivotally mounted on the wheel-axle and adapted to be pivotally connected to a vehicle comprising a part of the train, friction-gearing mounted on the motor-axle and the dynamo-shaft and means for shifting the gearing whereby the dynamo may be driven when the train is moving in either direction without reversing the motor-frame, substantially as described.

WILLIAM J. MORDEN.

Witnesses:
C. C. LINTHICUM,
L. F. MCCREA.